June 5, 1956    H. WEBER    2,748,602
PRESSURE GAGE
Filed July 3, 1952
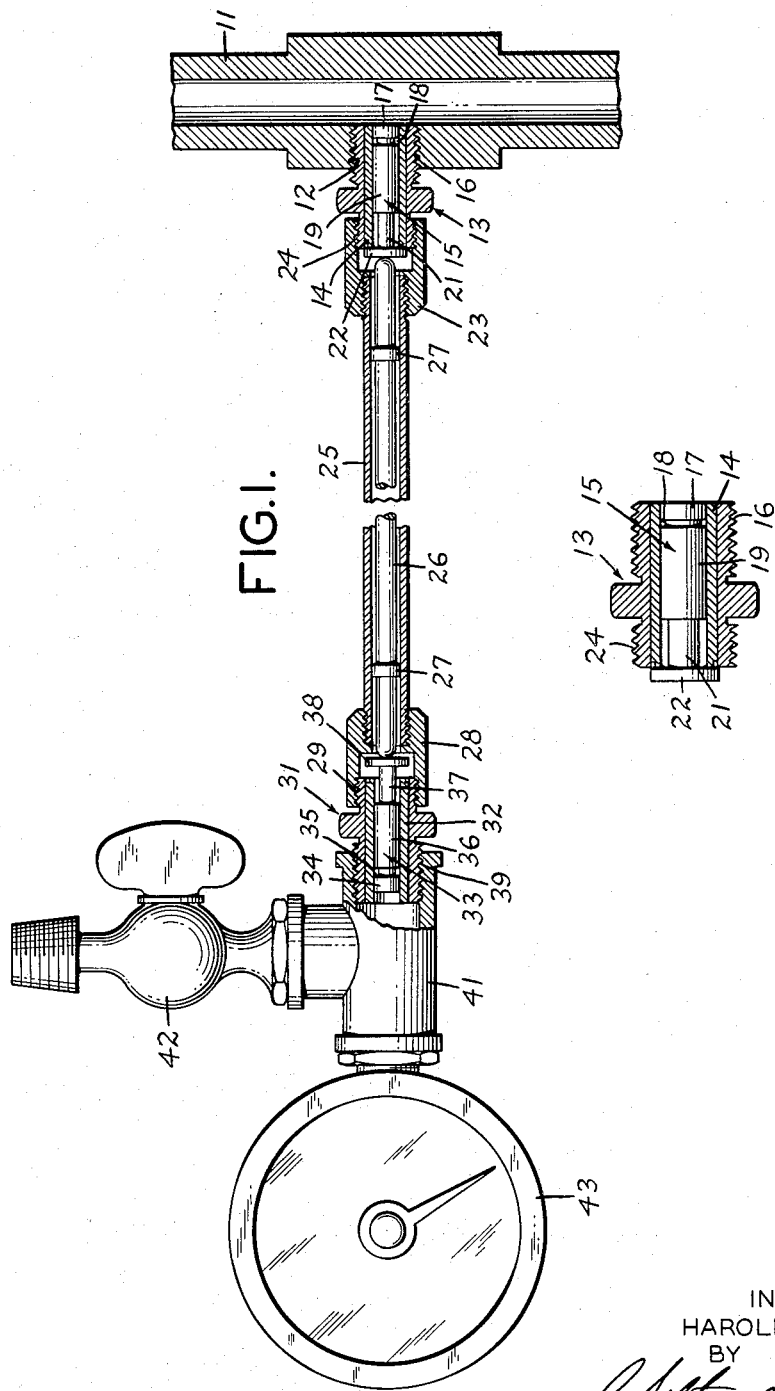
INVENTOR.
HAROLD WEBER 2,748,602

PRESSURE GAGE

Harold Weber, Bloomfield, N. J., assignor to Celanese Corporation of America, New York, N. Y., a corporation of Delaware Application July 3, 1952, Serial No. 297,038

2 Claims. (Cl. 73—395)

This invention relates to a pressure gage and relates more particularly to a pressure gage for the measurement of the pressure of a fluid that exhibits a tendency to change its characteristics.

It is frequently desirable to measure the pressure of a fluid that exhibits a tendency to gel or solidify or otherwise change its characteristics, for example, when cooled from an elevated temperature, through the loss of one or more constituents as by evaporation or the like, or as the result of chemical or physical changes occurring with the passage of time. When an attempt is made to measure the pressure of a fluid of this type employing a conventional pressure gage, it is found that the portion of the fluid entering the line leading to the said pressure gage will solidify or gel or otherwise change its characteristics making it substantially impossible to obtain accurate pressure readings. For example, in the melt spinning of polymeric materials, the polymer, which is a solid at normal temperatures, is raised to an elevated temperature at which it melts and is then forced through a conduit to a spinnerette containing one or more spinning apertures therein. If a conventional pressure gage is connected to the conduit through which the molten polymer is flowing, the polymer will tend to solidify in the line leading to the pressure gage so that no pressure readings can be obtained. Solidification of the polymer in the line leading to the pressure gage can, of course, be prevented by maintaining the said line at an elevated temperature above the melting point of the polymer. However, this expedient is unsatisfactory since the polymer in the line leading to the pressure gage will gradually decompose and carbonize thereby building up deposits on the walls of the said line which will lead to inaccurate pressure readings. The decomposition of the polymer will also serve to introduce undesirable impurities into the polymer.

It is an important object of this invention to provide a pressure gage which will be free from the foregoing and other difficulties and which will be especially simple in construction and efficient in operation.

A further object of this invention is to provide a pressure gage for the measurement of the pressure of a fluid that exhibits a tendency to solidify or gel or otherwise change its characteristics.

Other objects of this invention, together with certain details of construction and combinations of parts, will be apparent from the following detailed description and claims.

According to this invention, there is provided a pressure gage comprising a cylinder having a closely fitting piston positioned therein. The cylinder is fitted to a conduit or other passageway, through which the fluid whose pressure it is desired to measure flows, so as to expose the end of the piston to the fluid. The pressure of the fluid in said conduit will develop a force on said piston tending to move the piston in the cylinder. Operatively connected to the piston is a device for measuring said force whereby the pressure of the fluid can be ascertained. By designing the force measuring means so as to limit the movement of the piston to a relatively small distance, there will be no chance for any of the fluid to be trapped in the cylinder and gel, solidify or otherwise change its characteristics.

While several different types of force measuring means can be used to determine the force on the piston, particularly valuable results are obtained if the force on the piston is transmitted to a liquid to develop a pressure on the said liquid which can be measured by means of a conventional pressure gage. An especially desirable apparatus for measuring the force in this manner, comprises a second cylinder having a closely fitting piston positioned therein which piston is mechanically connected to the piston of the first cylinder. The piston of the second cylinder bears against a liquid in an enclosed chamber so as to develop a pressure therein which may be readily measured by means of a Bourdon-type pressure gage. When the fluid whose pressure is being measured is maintained at an elevated temperature, care should be taken to avoid heating the liquid against which the piston of the second cylinder bears since this would introduce errors into the pressure readings. The transmittal of heat to said liquid may be effectively prevented by introducing a number of point contacts in the means connecting the two cylinders, or by inserting a section of insulating material therein.

A preferred embodiment of this invention is shown in the accompanying drawings wherein Fig. 1 is a cross-sectional view of the pressure gage, partly in elevation, and Fig. 2 is a detail view, on an enlarged scale, of one portion of the pressure gage.

Referring now to the drawing, the reference numeral 11 designates a conduit through which a fluid comprising a molten polymer, for example, is forced by any suitable means (not shown). Fitting into an internally threaded opening 12 extending through a wall of the conduit 11 is a cylinder 13, lined with a bushing 14, and having a closely fitting piston, indicated generally by reference numeral 15, positioned therein. One end of the cylinder 13 is provided with an externally threaded portion 16 that engages the thread opening 12 to hold the cylinder 13 securely in place. The piston 15 comprises an end portion 17, which is exposed to the fluid passing through the conduit 11, a lubricating and sealing ring 18 which is filled with a suitable lubricant, and a main body portion 19 which, like the end portion 17, fits closely into the bushing 14. Extending from the body portion 19 is a piston rod 21 which carries a cap 22 of larger diameter than the bore of the bushing 14 to limit the movement of the piston 15 so as to prevent the end portion 17 from projecting out of the cylinder 13. The full pressure of the fluid flowing through the conduit 11 will be exerted against the end portion 17 of the piston 15. However, because of the tight fit of the piston 15 in the bushing 14 none of the said fluid will enter the cylinder 13 and there will be no tendency for the material to solidify or gel or otherwise change its characteristics.

For transmitting the force exerted by the fluid in the conduit 11 on the piston 15 to a suitable measuring device, there is provided a fitting 23 which is in engagement with a threaded portion 24 on the rear end of the cylinder 13. The fitting 23 supports a sleeve 25 in which is slidably mounted a rod 26 which contacts the cap 22 and which is of smaller diameter than the sleeve 25, but which is provided with a pair of collars 27 that engage the interior of said sleeve. Through the use of this construction the frictional forces tending to interfere with the free movement of the rod 26 are kept at a minimum. Fastened to the end of the sleeve 25 is a fitting 28 that is in engagement with a threaded portion 29 on the rear end of a cylinder 31 which is identical in construction with the clyinder 13. The cylinder 31 is provided with a bushing 32 having a closely fitting piston, indicated generally by reference numeral 33, positioned therein. The piston 33, like the piston 15, comprises an end portion 34, a lubricating and sealing ring 35 which is filled with a suitable lubricant, and a main body portion 36 which, like the end portion 34, fits closely into the bushing 32. Extending from the body portion 36 is a piston rod 37 which carries a cap 38 of larger diameter than the bore of the bushing 32, which cap 38 contacts the end of the rod 26. As shown in the drawing, the ends of the rod 26, which contact the caps 22 and 38 are rounded so as to maintain a point contact of the rod with said caps. This limits the transmission of heat from the molten polymer flowing in the conduit 11 to and from said rod. The front end of the cylinder 31 is externally threaded at 39 and is fastened to one arm of a T 41, to another arm of which is secured a petcock 42 and to the third arm of which is fastened a Bourdon-type pressure gage 43. For use, the T 41 and the Bourdon tube of the pressure gage 43 are filled completely with a liquid, such as oil, care being taken to remove all traces of air or other gases from said liquid.

The pressure of the molten polymer in the conduit 11 exerted against the end portion 17 of the piston 15 will develop a force tending to move said piston to the left. This force will be transmitted from the piston 15 to the rod 26 and from the said rod to the piston 33. The force on the piston 33 will be transmitted to the liquid in the T 41 developing a pressure in said liquid which will be indicated on the pressure gage 43. When the areas of the end portion of the pistons 15 and 33 are equal, the pressure shown by the pressure gage 43 will be equal to the pressure of the molten polymer in the conduit 11. When the areas of said pistons are not equal, a suitable correction factor will have to be applied to the reading of the pressure gage 43 to obtain the true pressure of the molten polymer. The total movement of the piston 15 in the cylinder 13 is extremely small even when high pressures are being measured so that none of the molten polymer will be trapped and tend to gel, solidify or otherwise change its characteristics. Despite the fact that the polymer in the conduit 11 is at a relatively high temperature, there will be little or no tendency for the heat from said polymer to raise the temperature of the liquid in the T 41, which would introduce errors into the pressure readings, because of the relatively large separation between the conduit 11 and the said T and the limited area for transfer of heat to and from the rod 26.

It is to be understood that the foregoing detailed description is given merely by way of illustration and that many variations may be made therein without departing from the spirit of my invention.

Having described my invention, what I desire to secure by Letters Patent is:

1. In an apparatus for measuring the pressure of a fluid, a cylinder having a closely fitting piston positioned therein, said piston having its end exposed to the fluid whereby the pressure of the fluid will develop a force tending to move said piston in said cylinder, a second cylinder having a closely fitting piston positioned therein, a rod bearing against the pistons operatively connecting the piston in the first cylinder to the piston in the second cylinder whereby the force on the first piston will be transmitted to the second piston, a sleeve having an internal diameter greater than the diameter of the rod encircling the rod, collars encircling said rod and contacting the sleeve to support the rod slidably in said sleeve, and means operatively connected to said second piston for measuring the force transmitted thereto, said force measuring means comprising a liquid in an enclosed chamber exposed to the end of the second piston whereby the force on said second piston will develop a pressure on the liquid, and means for measuring the pressure developed in the liquid.

2. In an apparatus for measuring the pressure of a fluid, a cylinder having a closely fitting piston positioned therein, said piston having its end exposed to the fluid whereby the pressure of the fluid will develop a force tending to move said piston in said cylinder, a second cylinder having a closely fitting piston positioned therein, a rod having rounded ends bearing against the pistons operatively connecting the piston in the first cylinder to the piston in the second cylinder, whereby the force on the first piston will be transmitted to the second piston, a sleeve having an internal diameter greater than the diameter of the rod encircling the rod, collars extending said rod and contacting the sleeve to support the rod slidably in said sleeve, and means operatively connected to said second piston for measuring the force transmitted thereto, said force measuring means comprising a liquid in an enclosed chamber exposed to the end of the second piston whereby the force on said second piston will develop a pressure on the liquid, and a Bourdon gage for measuring the pressure developed in the liquid.

References Cited in the file of this patent

UNITED STATES PATENTS

| | | |
|---|---|---|
| 1,183,675 | Rockstroh | May 16, 1916 |
| 2,518,540 | Green | Aug. 15, 1950 |
| 2,585,350 | Russell | Feb. 12, 1952 |
| 2,608,865 | Morgan et al. | Sept. 2, 1952 |

FOREIGN PATENTS

| | | |
|---|---|---|
| 505,503 | Great Britain | May 11, 1939 |
| 573,987 | Great Britain | Dec. 17, 1945 |
| 916,664 | France | Aug. 26, 1946 |